United States Patent [19]
Friedland et al.

[11] 3,924,474
[45] Dec. 9, 1975

[54] ANGULAR RATE SENSOR

[75] Inventors: Bernard Friedland, West Orange; John C. Stiles, Morris Plains, both of N.J.

[73] Assignee: The Singer Company, Little Falls, N.J.

[22] Filed: Nov. 12, 1974

[21] Appl. No.: 523,174

[52] U.S. Cl. .................................................. 73/505
[51] Int. Cl.² ......................................... G01C 19/56
[58] Field of Search ....................... 73/505, 517 AV

[56] References Cited
UNITED STATES PATENTS

| | | | |
|---|---|---|---|
| 2,309,853 | 2/1943 | Lyman et al. | 73/505 |
| 2,455,939 | 12/1948 | Meredith | 73/505 |
| 2,616,681 | 11/1952 | Morrow | 73/505 |
| 2,974,530 | 3/1961 | Jaouen | 73/505 |
| 3,520,193 | 7/1970 | Grangroth | 73/505 |
| 3,520,195 | 7/1970 | Tehon | 73/505 |

*Primary Examiner*—James J. Gill
*Attorney, Agent, or Firm*—T. W. Kennedy

[57] ABSTRACT

An angular rate sensor employing an elongated flexible rod which when driven vibrates in a plane fixed in relation to its housing. The housing is filled with a viscous gas for damping the oscillation of the rod in planes other than the driven plane. When the instrument is subjected to an input angular rate about an axis parallel to the symmetry axis, the plane of vibration is then angularly displaced from its fixed or driven plane. This angular displacement is proportional to the angular input rate. An electromagnetic drive circuit initiates and sustains oscillation of the rod and an electromagnetic pickoff circuit is employed to measure the angle between the plane of vibration and a fixed reference point on the housing which provides a measure of the angular rate.

4 Claims, 11 Drawing Figures

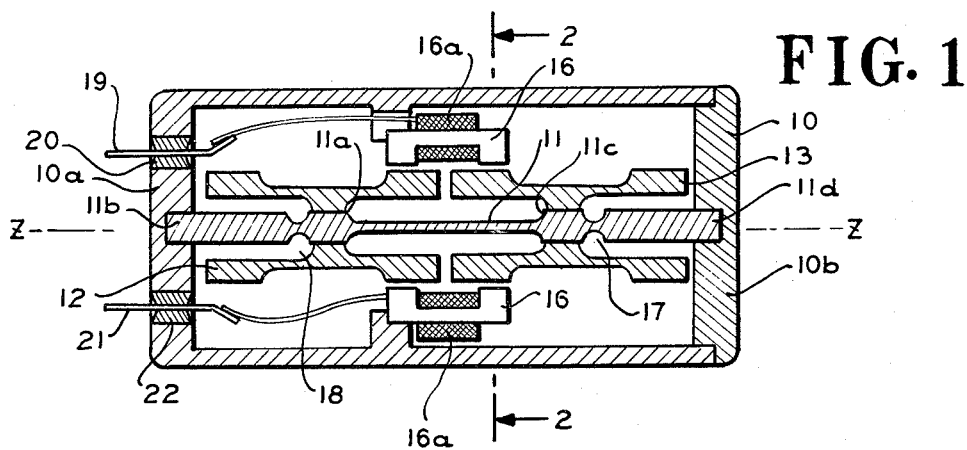
FIG. 1
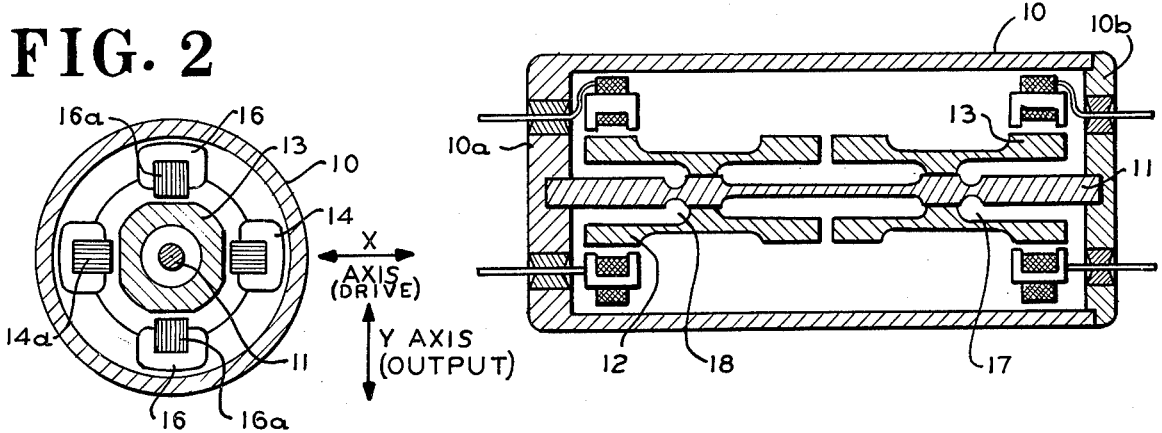
FIG. 2
FIG. 1A
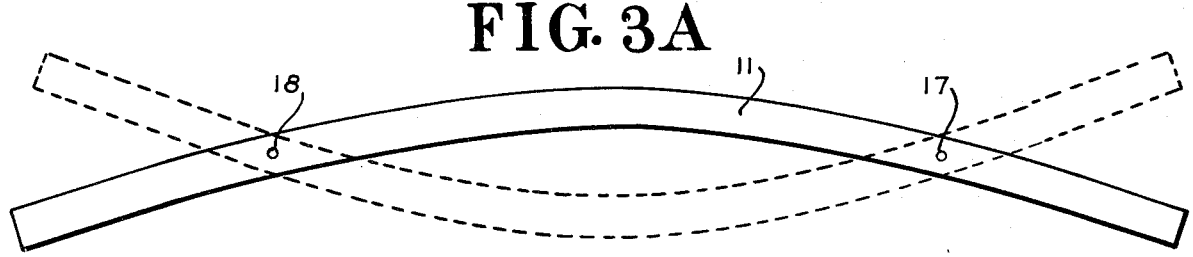
FIG. 3A
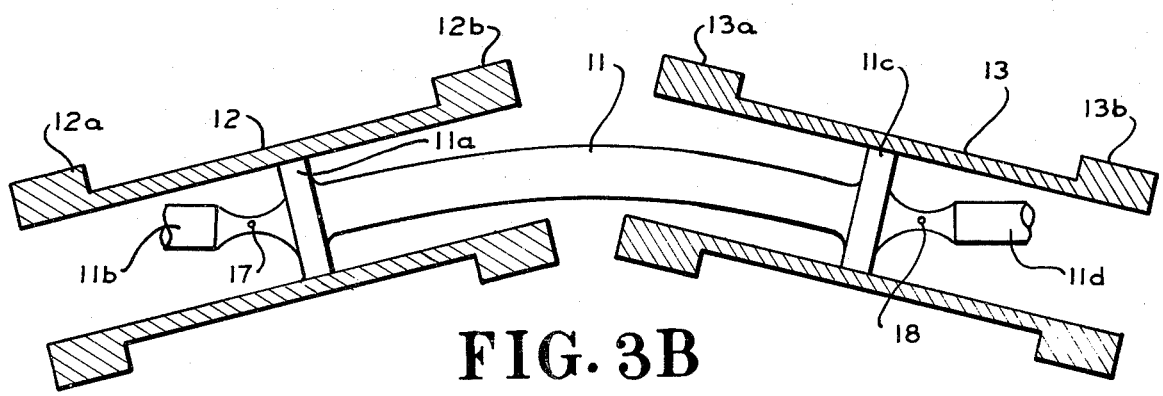
FIG. 3B

ANGULAR RATE SENSOR

This invention relates to angular rate sensors. More particularly, this invention relates to an angular rate sensor which employs a vibrating sensor element to measure the angular rate of change from a given axial reference point.

BACKGROUND OF THE INVENTION

The invention herein is related to co-pending application Ser. No. 498,035 filed Aug. 16, 1974. However, it differs from Ser. No. 498,035 in that the present instrument instead of being evacuated is filled with a viscous gas thus reducing the mechanical Q from approximately 60,000 to approximately 12. Secondly, the present invention provides an electromagnetic drive and pickoff unit instead of an electrostatic drive and pickoff. This is done to get a conveniently low impedance level on the drive and output circuits. Third, the drive and pickoff means in the present invention are fixed to the housing and perpendicular to each other.

Instrumentation for measuring angular rate as used in the past, employed the conventional restrained, damped single degree of freedom rate gyro. These devices have certain disadvantages because they require many moving parts which suffer from limited life and reliability as well as being expensive. In addition, these devices employ a spring restraint and thus oscillate in the absence of damping. In order to prevent this oscillation, the units are damped with viscous fluids. These fluids add other undesirable effects and complicate design because they introduce a sensitivity to temperature since the viscosity of practical fluids depends greatly upon the temperature.

BRIEF SUMMARY OF THE INVENTION

The present invention is based upon a discovery of Foucault over a century ago. He discovered that in the absence of disturbing forces the linear momentum vector of a vibrating system is stationary in inertial space. The present invention employs a flexible rod carrying inertia weights at nodal points located at both of its extremities. The rod is secured at each end in a housing which in turn may be strapped down to a vehicle the motion of which is to be measured. An alternating magnetic field is applied to the rod to drive it and suitable pickoff means are provided to measure the angle between the vibration plane and a fixed reference plane on the housing which gives a direct measure of angular rate when the instrument is rotated about its input axis.

Accordingly, it is an object of this invention to provide an angular rate sensor that has virtually no moving parts.

It is another object of this invention to provide an angular rate sensor that requires a relatively small number of parts which do not require a high degree of precision compared to conventional rate gyros.

It is yet another object of this invention to provide an angular rate sensor wherein the output angle of the device is governed by the damping force rather than by a mechanical spring.

It is still another object of this invention to provide an angular rate sensor wherein the scale factor depends mainly on the natural frequency and the damping.

A further object of this invention is to provide an angular rate sensor that is not subject to hysteresis and friction problems.

A still further object of this invention is to provide an angular rate sensor that is inherently insensitive to acceleration and vibration of the vehicle in which it is mounted.

In order to gain a better understanding of the invention, as well as other objects and further features thereof, reference is made to the following detailed description of the invention to be read in conjunction with the accompanying drawing wherein:

FIG. 1 is a sectional view of one embodiment of the angular rate sensor device of the invention;

FIG. 1a is a sectional view of a second embodiment of the invention;

FIG. 2 is a sectional view taken along the line 2—2 of FIG. 1 showing location of the flexible rod and magnetic pickoff;

Figure 4:
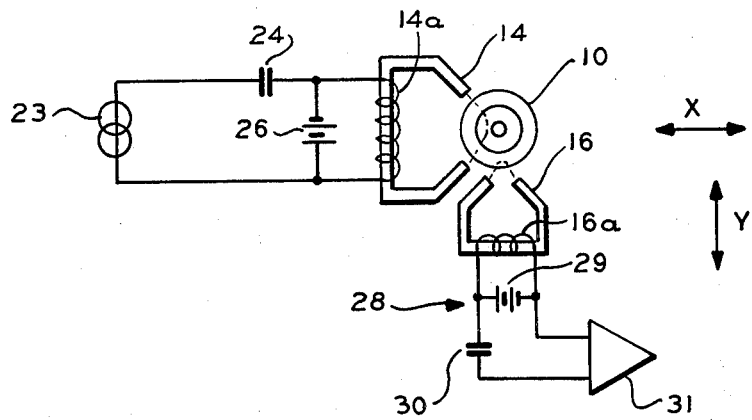
Figure 5:
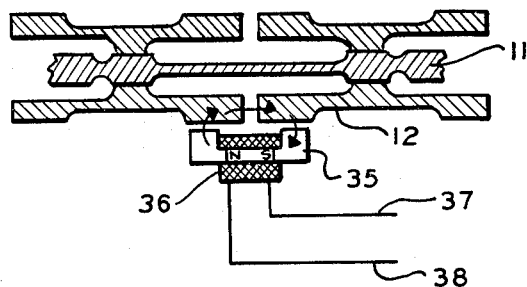

FIGS. 3a and b are sectional views showing the vibrating element and its nodal points;

FIG. 4 is a schematic diagram showing the drive and output circuits for the device;

FIG. 5 is a sectional view showing a detail of the magnetic pickoff; and

FIGS. 6–9 are representational idealized views showing the instrument being rotated about one of its axes.

Referring now to FIG. 1, the angular rate sensor device of the invention comprises a housing 10 which may be generally cylindrically elongated in shape and may be sealed by end walls 10a and 10b to contain a gas. Secured longitudinally at each end along the center axis of housing 10 is a flexible vibrating rod 11. This axis is designated the Z axis or input axis. The flexible vibrating rod 11 is an elongated tubular member having flared flanges 11a and 11c near necked down portions 18 and 17 respectively. Rod 11 is secured to the end walls 10a and 10b of housing 10 at its ends 11b and 11d. Necked down portions 17 and 18 constitute not only hinge points for rod 11 but also node points about which the vibrating rod oscillates.

Concentrically inserted over the ends 11b and 11d of rod 11 are a pair of tubular inertia weights 12 and 13. Tubular inertia weights 12 and 13 have circular end flanges 12a, 12b and 13a, 13b respectively and are in coaxial alignment with the inner diameter of housing 10 leaving a small space therebetween. The tubular inertia weights 12 and 13 may be made of the same material as rod 11 so that the coefficient of expansion of these elements are the same.

In the assembly of the instrument the inertia weights 12 and 13 may be moved axially over rod 11 in order to adjust the vibration frequency of rod 11 and to make the oscillation nodes coincide with the hinge points 17 and 18 of rod 11. Concentrically mounted over inertia weights 12 and 13 at the inboard flanges 12b and 13b are electromagnets 14 and 16 positioned perpendicularly to each other. The electromagnet 14 includes the winding 14a as seen in FIG. 2, and the electromagnet 16 includes a winding 16a shown in FIGS. 1 and 2. Electromagnet 14 is employed in the drive circuit to initiate and sustain vibration of rod 11 and electromagnet 16 is employed in the pickoff circuit for measuring angular rate relative to a fixed reference point on the housing. The drive circuit terminals 19 and 21 may be brought out from end wall 10a of housing 10 through insulators 20 and 22 respectively.

Turning to FIGS. 3a and 3b, there is shown the vibrating rod 11 with and without the inertia tubes oscillating about necked down or nodal points 17 and 18. The depiction of FIGS. 3a and 3b showing the vibration of rod 11 about the center axis Z in broken outline is greatly exaggerated for purposes of explanation. Once the flexible rod 11 is set into vibration it acts like the Foucault pendulum, i.e., the plane of vibration will tend to remain fixed in space even though the instrument may be rotated about the center line. This is made possible by the complete circular symmetry of all the parts of the instrument about the center line (see FIG. 2) so that the instrument has no preferred direction of vibration.

It is seen from FIGS. 3a and 3b that although flexible rod 11 is mechanically supported at ends 11b and 11d, it is in essence vibrating freely about nodes 17 and 18 without any mechanical restraints occassioned by the supports 11b and 11d. Moreover, the nodes 17 and 18 isolate ends 11b and 11d from the central portion of the rod and thus from the casing 10 itself. This construction results in the desirable condition that the instrument is insensitive to acceleration and vibration of the vehicle in which it is mounted.

The inertia tubes 12 and 13 perform two functions. First, they keep the frequency of vibration or oscillation low and secondly they force the nodes of the vibrating rod 11 to coincide with the necked down hinge sections 17 and 18. When this condition is met the center of gravity of the overall vibrating structure is stationary even though its parts move. This results in effectively decoupling the vibrating element from external vibrations. The inertia tubes force the nodes of the rod 11 to lie beyond the ends of the rod itself so that the simple necked down sections 17 and 18 may be used as the hinge support structure.

In FIG. 4 there is shown the drive and output circuits for the instrument. With regard to the drive circuit, a drive voltage from source 23 is maintained at the resonant frequency of the flexible rod 11 and is applied to winding 14a of electromagnet 14 through a DC blocking capacitor 24. A steady source of DC current 26 is also applied to winding 14a of electromagnet 14. Electromagnet 14 attracts the inboard ends of inertia tubes 12 and 13 causing them to oscillate along with rod 11. Inertia tubes 12 and 13 are made of a magnetically permeable material and thus are influenced by the flux generated by electromagnet 14. The force on inertia tubes 12 and 13 is proportional to the square of the current (i.e. $i^2_{AC} + 2i_{AC} i_{DC} + i^2_{DC}$). The same current can be sent through a diametrically opposite electromagnet which will produce the same force except that the term $2i_{AC} i_{DC}$ is of opposite sign. The net result is that the first and third terms cancel, and the net force is $4i_{AC} i_{DC}$. This force acting on the rod 11 between the inboard ends of inertia tubes 12 and 13 and the pivot or node points at necked down sections 17 and 18 produce the torque necessary to maintain the rod 11 in oscillation.

Circuitry similar to the drive circuit without the AC source may be used along the Y axis to serve as a pickoff. Thus, the output circuit comprises winding 16a of electromagnet 16, a fixed DC voltage source 29, a capacitor 30 and an amplifier 31. In the pickoff or output circuit the varying gap produced by the oscillations in the Y direction modulates the inductance 16, and hence the amount of current flowing in the DC bias supply, and this constitutes the output signal which can be brought out through DC blocking capacitor 30 and amplified by amplifier 31.

The purpose of the drive circuit is to maintain the vibrating structure in a continuous state of oscillation at its natural frequency with substantially constant amplitude. The purpose of the pickoff circuit is to measure the amplitude of oscillation (if any) in a direction perpendicular to the driven axis. However, if the instrument is rotated along its axis of symmetry (i.e. the Z axis which is perpendicular to the X and Y axes), the plane of vibration tends to remain fixed in inertial space, and a component of vibration appears along the Y axis. Because of the relatively low mechanical Q of the vibrating member and the gas contained within housing 10, however, the Y axis vibration tends to be damped out. The net result is that the plane of vibration is displaced from the X direction by an angle $\theta$ given by $\theta = (Q\dot{\phi})/(\pi F_n)$ where $\dot{\phi}$ is the input angular velocity in degrees per second, and $F_n$ is the frequency of vibration in Hz. Typical values are $\theta = 1°$ for an input rate of 100° per second for an instrument with a natural frequency of 400 Hz and a Q of 12.5. This is a typical scaling for rate gyros in aircraft control systems. Other ranges are possible by changing Q through the use of a different gas pressure or a different gas or a different rod material; or through a change in natural frequency which can be done conveniently by a different choice of rod diameter.

The electromagnetic units 14 and 16 or the drive and pickoff system provide a convenient means of obtaining low impedance levels in both the drive and output circuits.

The amplitude of the output signal is proportional to the product of the sine of the output angle $\theta$ and the amplitude of the oscillation. For applications requiring high precision, the amplitude can be monitored and controlled by appropriate circuitry. For most applications, however, the device can be built with its resonant frequency at some convenient value such as 400 Hz, and the magnetic drive can be powered by an external source of 400 Hz current. Because of the relatively low Q the resonant curve is quite broad and thus a shift of 1% (4Hz) between the natural resonance and the drive frequency will only make a 1% change in the output scale factor.

FIG. 5 depicts an alternate pickoff circuit. In this arrangement the DC power source is replaced by a permanent magnet 35 which is an integral part of the magnetic circuit. The magnetic flux in the air gap is the same as in FIG. 4 and thus the drive force and the output voltage will have the same characteristics. This configuration has the advantage of eliminating the requirement for a DC bias supply. However, additional AC power is required to overcome the magnetic reluctance of the permanent magnet.

Figure 6:
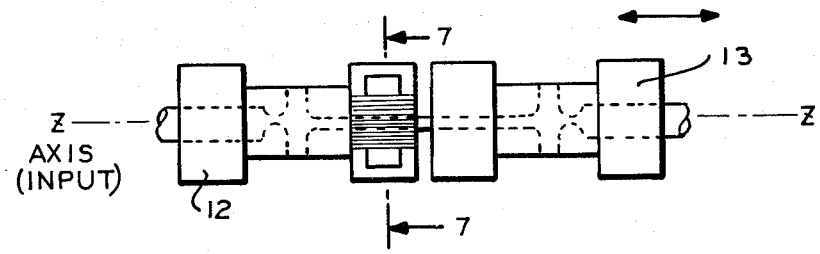

The operation of the device is best explained by referring to FIGS. 6–9. It should be noted that FIGS. 6–9 are representational drawings which have been simplified for purposes of explanation. In FIG. 6 there is shown a side view of the vibrating rod and inertia tubes with the housing removed. It is seen from FIG. 6 that the vibrating rod 11, shown in broken outline, lies along the Z axis. The inertia weights 12 and 13 are shown inserted over vibrating member 11.

Figure 7:
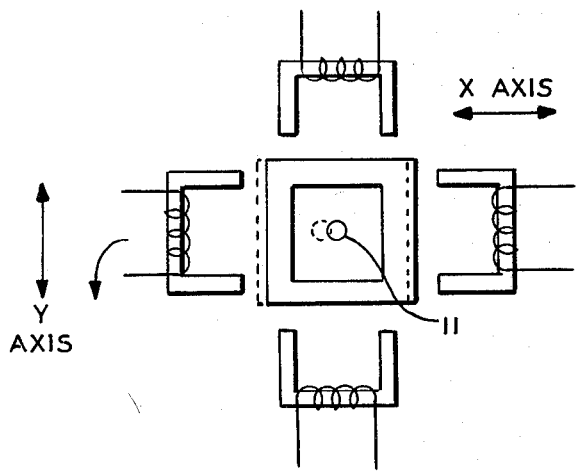

FIG. 7 is a sectional view taken along the line 7–7 of FIG. 6 showing the drive electromagnet 14 and the pickoff electromagnet 16. In FIG. 7, the X axis is shown in the horizontal plane and the Y axis is shown in the vertical plane. It is seen from FIG. 7 that the vibrating member 11 has an amplitude of vibration along the X axis, as shown by the motion in broken outline. However, there is no amplitude of vibration along the Y axis. This condition is as it should be since there is no output from the sensor when the instrument is not being rotated.

Figure 8:
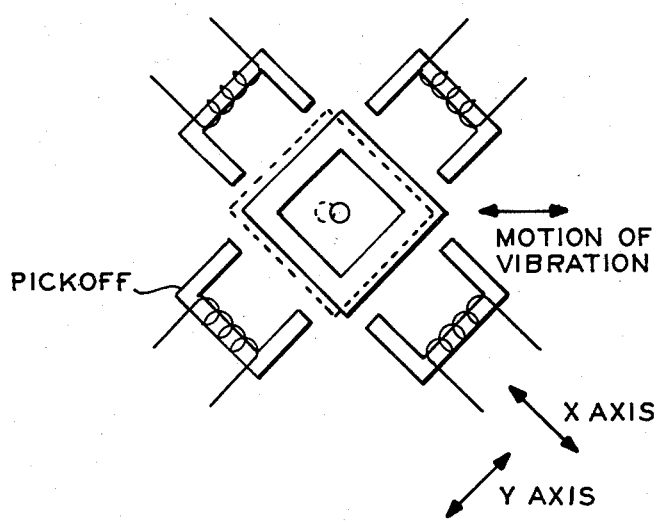
Figure 9:
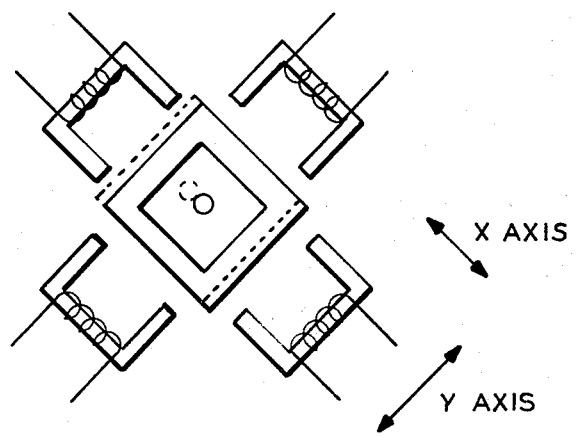

If the instrument is rotated about its Z (input) axis, the plane of vibration would initially tend to remain stationary in space in accordance with Foucault's principle, as shown in FIG. 8. Since there is no drive force along the Y axis, however, the component of motion along the Y axis damps out because of the inherent mechanical damping of the vibrating rod and the gas. Thus the plane of vibration ultimately returns to the X axis, as shown in FIG. 9. If the instrument is rotated at a constant rate, so that the angle through which the instrument is rotated keeps increasing, there will be a fixed angular offset between the Y axis and the plane of vibration. The offset angle is achieved as the balancing of two contrary effects: the Foucault effect in which the plane of vibration tends to stay fixed in space, and the damping effect which causes vibration normal to drive axis to dissipate, and thus, tends to keep the plane of motion along the drive axis. The mathematical relationship between the constant input rate $\phi$ and the angle $\theta$ of the plane of vibration from the Y axis is $$\theta = \frac{Q}{\pi F_n} \dot\phi$$

where $F_n$ is the frequency of vibration in Hz.

The pickoff is along the Y axis and thus produces a signal proportional to the component of motion along the Y axis. Hence $$\text{output} = A \sin \theta$$

where A is the pickoff scale factor. The angle $\theta$ is generally small enough to permit the approximation $\sin \theta \approx \theta$. Hence $$\text{output} \approx \frac{AQ}{\pi F_n} \dot\phi$$

i.e., the output is proportional to the input angular rate $\dot\phi$.

From the foregoing it is seen that the invention herein has certain advantages over conventional angular rate sensors. First, the present invention has no moving parts per se. This greatly enhances the reliability and life of the instrument.

Second, the total number of parts is very small and the parts required do not have to be made with a high degree of precision. Thus, the cost of the instrument is less. Third, the output angle of the device is governed by the damping force (the inverse of the Q) rather than by a mechanical spring, and the resonance problem of a conventional rate gyro is eliminated. Fourth, the scale factor depends mainly on the natural frequency and the damping. Since these factors are relatively unaffected by temperature changes (because of the use of gas damping) the instrument may be operated at any temperature without warmup. Fifth, the instrument is not subject to the hysteresis and friction problems associated with conventional rate gyros. Sixth, the instrument is inherently insensitive to acceleration and vibration except for vibration at its natural frequency, and the sensitivity can be made as small as desired by proper balancing.

There are many alternate methods of construction that will occur to those skilled in the art. For example, the pickoff and drivers can be located at either or both ends of the inertia tubes as shown in FIG. 1a. The output vibration can be sensed by electrostatic or optical means. And the natural frequency of the vibrating rod can be lowered with the use of central weights as shown in co-pending application Ser. No. 498,035. Finally, if it is desired to control the amplitude more precisely, an extra X axis pickoff can be used at one end of the instrument in order to sense the amplitude so that the drive power may be automatically adjusted to keep the amplitude constant.

While the present invention has been described in preferred embodiments, it will be obvious to those skilled in the art that various modifications can be made therein within the scope of the invention. It is intended that the appended claims cover all such modification.

What is claimed is:

1. An angular rate sensor for measuring the angular rate of change about a reference axis comprising:
   a. a housing;
   b. an elongated flexible vibrating rod secured at both ends in said housing and having first and second nodal points proximate to its ends equidistant from the center of the rod;
   c. fluid damping means filling said housing;
   d. a first inertia means operative on the first nodal point of said rod; and
   d. first and second inertia means operative on the first and second nodal points, respectively, for adjusting the natural frequency of said rod and the position of said nodal points, whereby the nodal points may be adjusted to lie beyond the ends of said rod and said rod decoupled from external vibrations.

2. The apparatus of claim 1 comprising: electromagnetic drive means employing a DC reference voltage superimposed on an AC drive voltage said drive means initiating and sustaining oscillation of said rod.

3. The apparatus of claim 2 comprising: electromagnetic pickoff means for measuring the angular velocity between said plane of vibration and said predetermined reference plane.

4. An angular rate sensor comprising:
   a. a housing;
   b. an elongated vibrating member having an equal natural resonant frequency about its longitudinal axis positioned in said housing said vibrating member lying in the plane of the longitudinal axis of said housing and connected at its outboard ends to the end walls of said housing said outboard ends of said vibrating member having necked-down portions spaced equidistant from the ends walls of said housing said necked-down portions establishing nodal points about which said vibrating member maintains oscillation and mechanically decoupling said vibrating member from said end walls of said housing;
   c. means for driving said vibrating member into oscillation and for maintaining said oscillation;
   d. means in said housing for damping the oscillations of said vibrating member,
   e. means for measuring the angle between said plane of vibrations and a predetermined reference plane for translation into the angular rate of change about said reference point; and
   f. a pair of tubular inertia weights in said housing each attachable to said vibrating rod proximate said neck-down portions for adjusting the vibrating frequency of said vibrating member and adjusting the nodal points of said vibrating member to lie beyond the outboard ends of said vibrating member so that said necked-down portions constitute a hinge support.

* * * * *